Patented Nov. 9, 1943

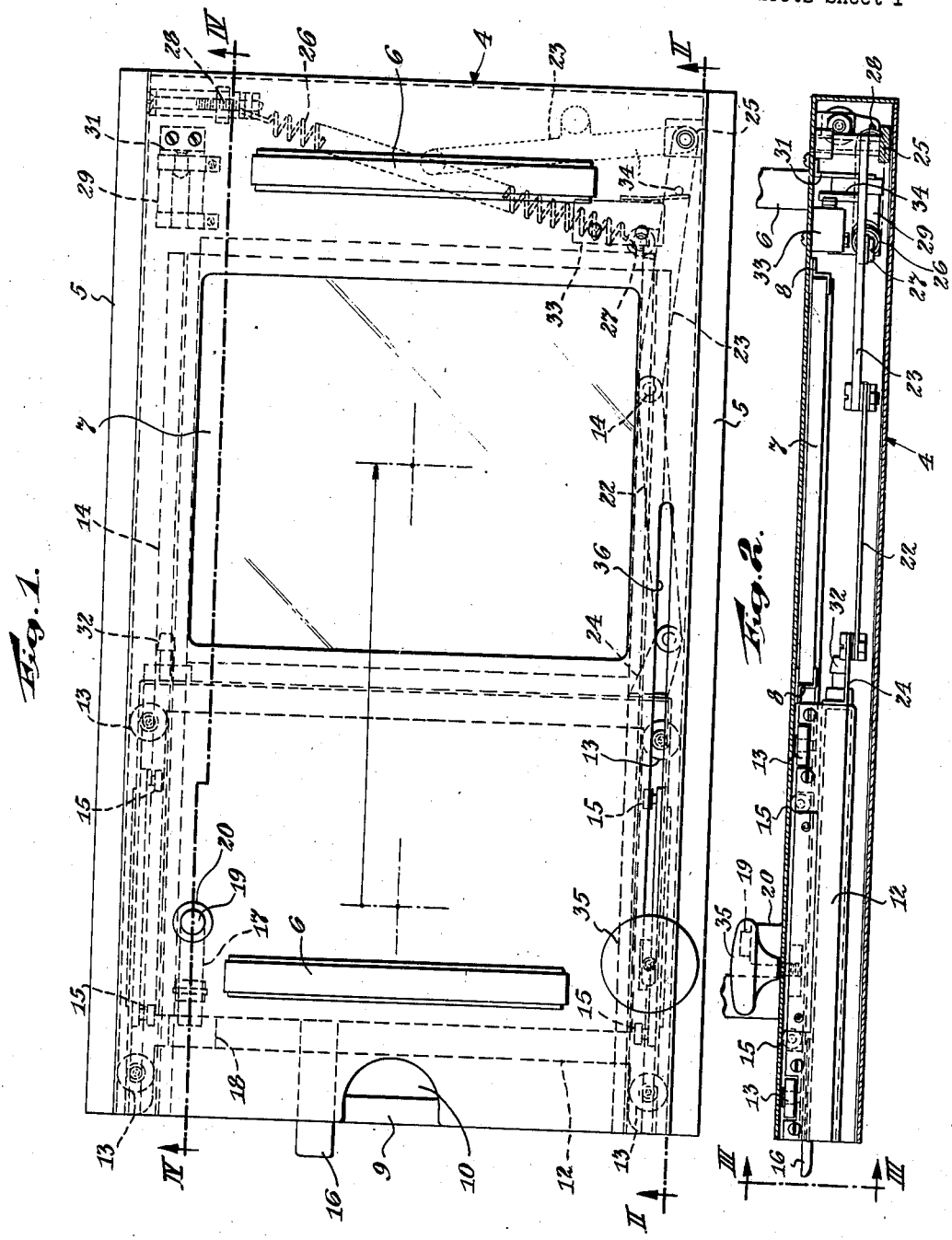

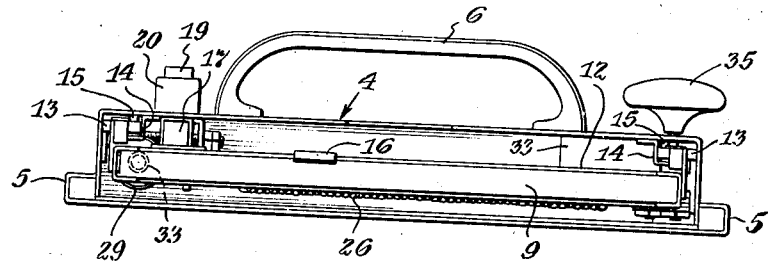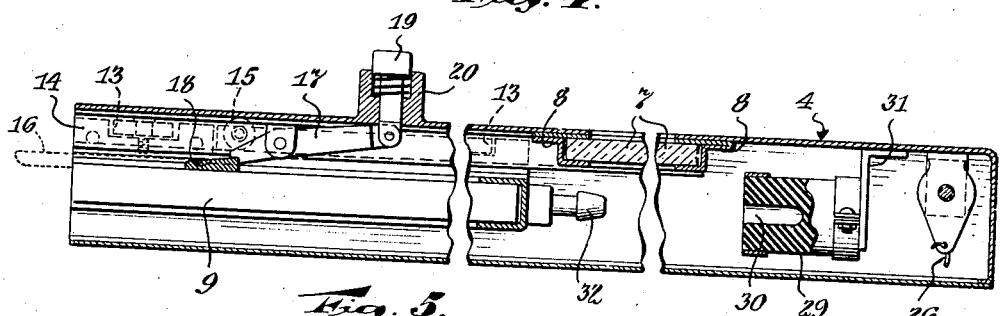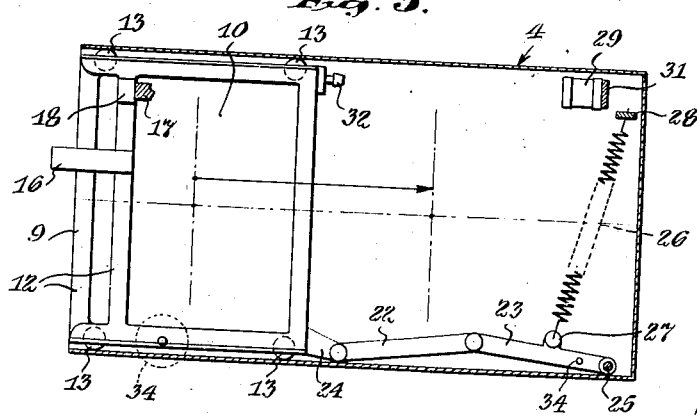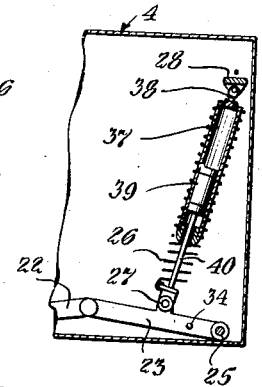

2,333,720

UNITED STATES PATENT OFFICE 2,333,720

MOVABLE CASSETTE FOR SPOT FILM DEVICES

Oswald C. Hollstein, Baltimore, Md., assignor to Westinghouse Electric & Manufacturing Company, East Pittsburgh, Pa., a corporation of Pennsylvania Application October 14, 1942, Serial No. 461,957

6 Claims. (Cl. 250—68)

The present invention relates to X-ray apparatus and more particularly to what is known in the art as a spot film device.

Apparatus of this kind is known to the art and is employed by the roentgenologist in the making of a diagnostic examination both by fluoroscopy and radiography. In other words, it frequently happens that during the making of a fluoroscopic examination the diagnostician will observe some phenomenon of which he desires a more permanent record for further detail study. This can be readily accomplished in a spot film device since a cassette containing a photographic film or plate is very rapidly movable into position adjacent the fluorescent screen and exposed to the same image observed by the diagnostician on the fluorescent screen.

Consequently, apparatus of this type must meet certain requirements. For example, the cassette must be movable very quickly with as little expenditure of effort as possible and come to rest in the appropriate position adjacent the fluorescent screen with little or no vibration or shock. Heretofore, various driving arrangements for moving the cassette have been successfully employed, but the apparatus was of such small dimensions, the cassette being of approximately 5 by 7 inches, that very little difficulty was encountered. When larger films are desired, which is now the trend of all diagnosticians, the above noted requirements are much more difficult to achieve.

It is accordingly the primary object of the present invention to provide an X-ray apparatus wherein the diagnostician during the making of a fluoroscopic examination can very readily make a radiographic exposure of relatively large size by movement of a cassette into the field of examination with great rapidity and ease of operation.

Another object of the present invention is the provision of an X-ray spot film device wherein a radiographic film within a cassette is rapidly moved into the examination field by a simple and efficient driving mechanism.

A further object of the present invention is the provision of an X-ray spot film device wherein a film-holding cassette is moved into the examination field adjacent the fluorescent screen by a simple link mechanism operated by a spring drive, and requiring the expenditure of very little energy by the drive despite relatively long travel of the cassette.

Still further objects of the present invention will become obvious to those skilled in the art by reference to the accompanying drawings wherein:

Fig. 1 is a vertical view of an X-ray spot film device constructed in accordance with the present invention;

Fig. 2 is a sectional view taken on the line II—II of Fig. 1;

Fig. 3 is an end view of the device on the line III—III of Fig. 2;

Fig. 4 is a fragmentary sectional view taken on the line IV—IV of Fig. 1;

Fig. 5 is a schematic drawing of the X-ray spot film device of the present invention and showing the same in position for the making of a fluoroscopic examination;

Fig. 6 is a view similar to Fig. 5 but showing the spot film device in the radiographic position, and Fig. 7 is a cross-sectional fragmentary view which a part of the apparatus may take.

Referring now to the drawings in detail, the device as shown in Fig. 1 comprises a hollow framework 4 having an X-ray pervious portion as well as an impervious portion and provided with channel guides 5, so that the device slideably engages the customary support (not shown) forming a part of the usual X-ray examination table or vertical fluoroscope, and is moved as desired by handles 6.

A fluorescent screen 7 is supported in a suitable manner, such as by angle members 8, slightly to one side of the center of the hollow framework 5 and constituting the X-ray pervious portion of the device. During the making of a fluoroscopic examination when the image appears on the fluorescent screen, a cassette 9 holding a radiographic plate or film 10 is disposed interiorly of the hollow framework 5 on the opposite side of the center of the latter from that of the fluorescent screen 7 in the X-ray impervious portion of the device. This cassette 9 is supported within a rectangular carriage 12 (see Figs. 5 and 6), which is provided at its four corners with suitable rollers 13 bearing against the end wall of the hollow framework 5 and an angle iron 14, thus forming a guide-way, as best illustrated in Fig. 3. Additional rollers 15 are also rotatably affixed to the cassette carriage which are disposed at 90° to the rollers 13 so that the former ride against the underside of the hollow framework 5, both sets of rollers accordingly maintaining the cassette carriage 12 in substantially fixed guide-ways and preventing lateral movement of the cassette 9, the latter of which is held in the carriage 12 by a spring latch 16.

The cassette carriage 12 is in turn held in the position shown in Fig. 5 during the making of a fluoroscopic examination by a pivoted latch 17, one end of which engages a lug 18 on the cassette carriage 12 and being movable about its pivot to unlatch the carriage 12 by a spring-pressed push button 19 recessed in a projection 20 on the front of the device. If, during the making of a fluoroscopic examination, the roentgenologist observes some phenomenon of which he desires to make a record for further detailed study, it is necessary that the cassette carriage 12 carrying the cassette 9 and film 10 be moved into the field of examination, which is adjacent the fluorescent screen between the latter and the body of the patient, as rapidly as possible and without shock or vibration.

To accomplish this, the cassette carriage 12 is connected to a toggle arrangement comprising a pair of pivoted link members 22 and 23 connected together at one of their respective ends while the remaining end of the link 22 is pivotally connected to a projection 24 forming a part of the cassette carriage 12 and the other end of the link 23 being pivotally connected to a lug 25 formed on the interior of the hollow framework 4. In the "fluoroscopic" position of the spot film device the cassette carriage 12 is thus "cocked" with the toggle links in an extended position, as shown in Figs. 1 and 5, placing the pivotal connection between the links 22 and 23 slightly off dead center from their pivotal connections 24 and 25.

For the purpose of collapsing the toggle arrangement and causing movement of the cassette carriage 12 upon depression of the release button 19, a coil spring 26 is connected to a point 27 on the toggle link 23 and adjustably connected to a lug 28 depending from the underside of the hollow framework 4. Due to the positioning of this spring 26 the ratio of expansion to movement of the cassette carriage is exceedingly high since very little expansion and stored potential energy is required to move the cassette carriage the entire length of its travel which may be as much as 18 inches or more. Moreover, the cassette carriage 12 will move longitudinally of the framework 4 along the guide-way 14 with great rapidity and practically no vibration upon depression of the push button 19 and release of the latch 17, owing to the leverage exerted by the toggle arrangement in transferring the stored energy from the spring 26 to movement of the cassette carriage 12.

To prevent shock and oscillations when the cassette carriage 12 finally comes to rest in the radiographic position, as shown in Fig. 6, a shock absorber 29 in the form of a soft rubber cushion provided with a recess 30 therein is supported by a bracket 31 and is engaged by a taper-headed plunger 32 projecting from the cassette carriage 12. This positions the cassette carriage together with the cassette 9 and film 10 in the field of examination beneath the fluorescent screen 7, enabling the taking of a radiographic exposure. Moreover, since the energy supplied to the X-ray tube must usually be higher than during the making of a fluoroscopic examination, a switch 33 is provided which may operate to cut a resistance in and out of the circuit for the primary winding of the energizing transformer. As shown in Figs. 1 and 2, the link member 23 is provided with a pin 34 engaging the switch 33 to close the latter when the cassette carriage is in the impervious portion of the frame 4, thus conditioning the X-ray tube (not shown) for fluoroscopic purposes, and when the cassette carriage is moved to the radiographic position by collapse of the toggle arrangement, the link 23 moves so that the pin 34 disengages the switch 33, thus opening the latter causing the X-ray tube to automatically receive somewhat higher energizing current suitable for radiographic purposes.

Upon completion of the exposure, the roentgenologist returns the cassette carriage, together with the cassette and exposed plate or film, to its "cocked" position by a knob 35 projecting through a slot 36 in the framework 4 and secured to the cassette carriage 12, as shown more clearly in Figs. 1 and 2, which thus slides the carriage along its guide-way, again tensioning the spring 26 until the catch 17 engages the tapered lug 18 to hold the carriage in the "fluoroscopic" position of the device.

In Fig. 7 a slight modification of the spring drive and check portion of the apparatus is shown wherein the spring 26 surrounds an oil or air check comprising a cylinder 37 having an extending shaft 38 pivotally connected to the lug 28, and one end of the spring 26 may be again connected to the lug 28 or to the shaft 38 as shown in Fig. 7. A piston 39 having a rod 40 telescopically engages the cylinder 37 with the free end of the piston rod 40 being pivotally secured to the point 27 on the toggle link 23. Not only does this construction eliminate the necessity for the shock absorber 29 and plunger 32, but since very little spring motion is required to move the cassette, it follows that the air or oil check piston 39 necessarily travels only a short distance despite the fact that the cassette travel may be 18 inches or more. This materially reduces the overall length of the spot film device, for if an air or oil check were used which was connected directly to the cassette, the travel of the check piston would necessarily have to be substantially equal to the cassette travel, thus requiring enlargement of the apparatus.

It thus becomes obvious to those skilled in the art that a spot film device is herein provided by which the roentgenologist can make a fluoroscopic examination, and during the making of such examination he can readily take a radiographic picture by simply depressing a button, thus automatically moving a sensitized plate or film rapidly and without vibration into the field of examination. Moreover, by the provision of a collapsible toggle arrangement wherein the driving force for moving the cassette carriage is applied substantially at right angles to the direction of movement of the cassette carriage and the normal "cocked" position of the toggle links, an exceptionally efficient mechanism is provided since very little potential energy is required which necessitates very little expansion of a coil spring.

Although one specific embodiment of the present invention has been shown and described, it is to be understood that still further modifications of the present invention may be made without departing from the spirit and scope of the appended claims.

I claim:

1. An X-ray spot film device comprising a frame having an X-ray pervious portion and an impervious portion, a fluorescent screen disposed in said X-ray pervious portion for making fluoroscopic examinations, a cassette carriage supporting a cassette provided with a sensitized film therein normally positioned at the X-ray impervious portion of said frame, and means for moving said cassette carriage into the field of examination at the will of an operator to make a radiographic exposure on said film including a collapsible toggle arrangement connected to said cassette carriage and a tensioned member operable to cause collapse of said toggle arrangement.

2. An X-ray spot film device comprising a frame having an X-ray pervious portion and an impervious portion, a fluorescent screen disposed in said X-ray pervious portion for making fluoroscopic examinations, a cassette carriage supporting a cassette provided with a sensitized film therein movable longitudinally of said frame and normally latched under tension at the X-ray impervious portion of said frame, and means for causing movement of said cassette carriage at the will of an operator to position the film in the field of examination for a radiographic exposure including a collapsible toggle arrangement connected to said cassette carriage and potential energy storage means connected to said toggle arrangement and operable to cause collapse of the latter upon unlatching of said cassette carriage while in its position at the impervious portion of said frame.

3. An X-ray spot film device comprising a frame having an X-ray pervious portion and an impervious portion, a fluorescent screen disposed in said X-ray pervious portion for making fluoroscopic examinations, a guide-way on said frame, a cassette carriage supporting a cassette provided with a sensitized film therein adapted to move longitudinally of said frame along said guide-way and normally latched under tension at the X-ray impervious portion of said frame, and means for causing movement of said cassette carriage along said guide-way at the will of an operator to position the film in the field of examination for a radiographic exposure including a collapsible toggle arrangement connected to said cassette carriage and a tensioned member connected to said toggle arrangement and operable to cause collapse of the latter upon unlatching of said cassette carriage while in its position at the impervious portion of said frame.

4. An X-ray spot film device comprising a frame having an X-ray pervious portion and an impervious portion, a fluorescent screen disposed in said X-ray pervious portion for making fluoroscopic examinations, a guide-way on said frame, a cassette carriage supporting a cassette provided with a sensitized film therein adapted to move longitudinally of said frame along said guide-way and normally latched under tension at the X-ray impervious portion of said frame and means for causing movement of said cassette carriage along said guide-way at the will of an operator to position the film in the field of examination for a radiographic exposure including a collapsible toggle arrangement connected to said cassette carriage and a coil spring connected to said toggle arrangement and operable to cause collapse of the latter upon unlatching of said cassette carriage while in its position at the impervious portion of said frame.

5. An X-ray spot film device comprising a frame having an X-ray pervious portion and an impervious portion, a fluorescent screen disposed in said X-ray pervious portion for making fluoroscopic examinations, a cassette carriage supporting a cassette provided with a sensitized film therein movable longitudinally of said frame and normally latched under tension at the X-ray impervious portion of said frame, and means for causing movement of said cassette carriage at the will of an operator to position the film in the field of examination for a radiographic exposure including a collapsible toggle arrangement connected to said cassette carriage and a coil spring connected to said toggle arrangement and disposed substantially normal to the direction of movement of said carriage to confine expansion thereof to narrow limits and operable to cause collapse of said toggle arrangement with movement of said cassette carriage the length of its travel upon unlatching of said cassette carriage while in its position at the impervious portion of said frame.

6. An X-ray spot film device comprising a frame having an X-ray pervious portion and an impervious portion, a fluorescent screen disposed in said X-ray pervious portion for making fluoroscopic examinations, a cassette carriage supporting a cassette provided with a sensitized film therein movable longitudinally of said frame and normally latched under tension at the X-ray impervious portion of said frame, a pair of pivoted toggle links interconnecting said cassette carriage and said frame and disposed slightly less than 180 degrees with respect to each other in the latched position of said cassette carriage, and a coil spring connected to one of said toggle links at substantially right angles thereto to cause collapse of said toggle links and attendant movement of said cassette carriage at the will of an operator into the field of examination adjacent said fluorescent screen for a radiographic exposure upon unlatching of said cassette carriage.

OSWALD C. HOLLSTEIN.